United States Patent [19]

Richmond

[11] 4,113,455

[45] Sep. 12, 1978

[54] BAG TENSIONING ARRANGEMENT

[75] Inventor: Donald Louis Richmond, Scio, N.Y.

[73] Assignee: The Air Preheater Company, Inc., Wellsville, N.Y.

[21] Appl. No.: 862,894

[22] Filed: Dec. 21, 1977

[51] Int. Cl.² .................................. B01D 46/02
[52] U.S. Cl. ............................. 55/378; 55/508
[58] Field of Search ............... 55/147, 149, 378, 508, 55/509, DIG. 26; 248/381, 410; 267/177; 210/350, 352

[56] References Cited

U.S. PATENT DOCUMENTS

| 1,734,170 | 11/1929 | Leffert | 248/410 |
| 2,014,298 | 9/1935 | Schneible | 55/378 |
| 2,090,550 | 8/1937 | Pilblad | 248/410 |
| 2,350,011 | 5/1944 | Black | 55/96 |
| 3,241,297 | 3/1966 | Hanes | 55/302 |
| 3,710,559 | 1/1973 | Harris et al. | 55/378 |
| 3,724,178 | 4/1973 | LeBoeuf | 55/378 |

Primary Examiner—Frank W. Lutter
Assistant Examiner—David L. Lacey
Attorney, Agent, or Firm—Wayne H. Lang

[57] ABSTRACT

A bag filter and a filter bag tension means for providing a predetermined tension on the filter bag. The tension may be quickly varied or even completely removed to provide an optimum tension for dust collecting or rapid bag removal.

3 Claims, 3 Drawing Figures

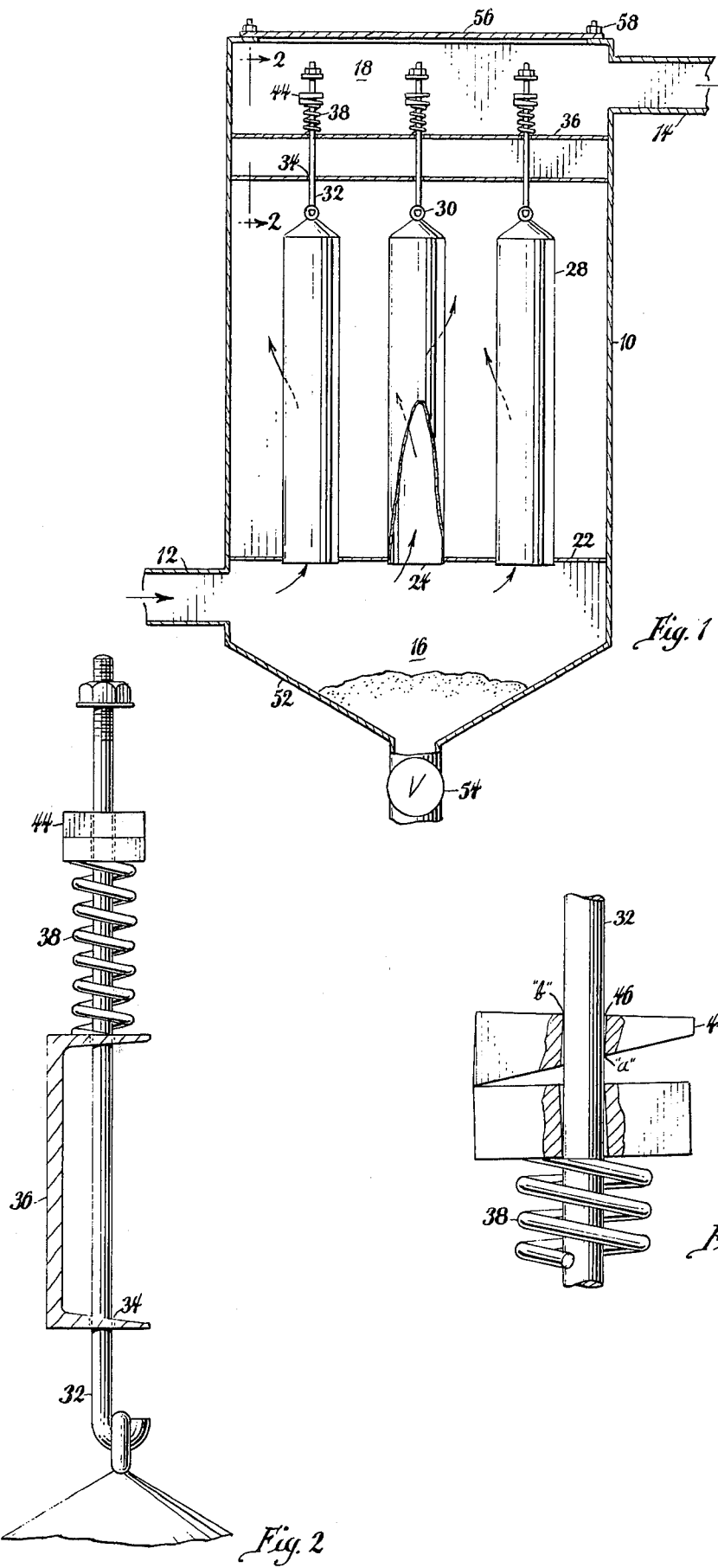

BAG TENSIONING ARRANGEMENT

BACKGROUND OF THE INVENTION

1. Field of the Invention

The present invention is directed to bag filter apparatus of the type that removes dust and other foreign particles from a gaseous medium by directing the gas through the interstices of a fabric filter cloth, while the dust particles are collected on the surface of the fabric.

2. Description of the Prior Art

It is well known that gaseous streams may be cleaned of entrained particles by directing the gaseous streams through fabric filtering elements that are formed as cylindrical filter bags.

An array comprising a multiplicity of bags connected in parallel is commonly known as a bag house, and the bags of a given bag house obviously are most effective when maintained in a reasonably clean condition. Inasmuch as deposits of dust collecting on the surface of the filter bags are typically removed by shaking or vibrating the bags or subjecting them to a reverse air flow, the bags stretch, loosen and wear until their collecting effectiveness is largely diminished.

To maintain a high degree of collecting efficiency of the filter bags, the bags must be kept clean and in a uniformly taut condition, and they must be replaced with new bags when they become excessively worn or the fabric has deteriorated.

Accordingly, the art as represented by U.S. Pat. No. 2,350,011 of Black dated May 30, 1944, and U.S. Pat. No. 3,241,297 of Hanes dated Mar. 22, 1966, discloses arrangements by which filter bags are supported by resilient spring biasing means that place a continuous bias upon each filter, whereby it is maintained in a uniformly taut condition.

However, replacing the filter bags or adjusting the tension being applied to loose bags whereby they may be maintained in a uniformly taut condition is an extremely time-consuming, if not impossible, task that usually requires the complete shutdown of a bag house while repairs or adjustments are being made.

SUMMARY OF THE INVENTION

This invention therefore has a general objective the provision of an arrangement by which the tension on an elongate filter bag may be quickly varied to provide an optimum degree of tension to all bags hanging in a bag house. The invention includes moreover, an arrangement permitting the rapid exchange of filter bags whereby any eroded or torn filter bag may be quickly replaced and a proper degree of tension applied thereto in a minimum amount of elapsed time.

BRIEF DESCRIPTION OF THE DRAWING

FIG. 1 is a side elevation of a bag filter device that may be employed in the practice of this invention, FIG. 2 is an enlarged view showing the details of construction of a particular bag tensioning device as seen from line 2—2 of FIG. 1, and FIG. 3 is an enlarged drawing that shows the details of a modified form of spring biasing means.

DESCRIPTION OF THE PREFERRED EMBODIMENT

The filtering apparatus of this invention comprises a housing 10 with imperforate walls that enclose a chamber therein. The housing has an inlet 12 for a dust bearing gas and an outlet 14 for the exhaust of a clean gas therefrom. The central chamber is divided into an inlet compartment 16 and an outlet compartment 18 by a tube sheet 22 that is provided with a series of apertures 24. The apertures 24 are each surrounded by the open end of a tubular bag filter 28, while the opposite end of each bag is closed and connected pivotally at 30 to a linkage rod 32. The bags 28 are formed from a porous fabric that permits clean gas to flow through the interstices thereof, while the dust entrained therein is captured on the fibrous walls of the filter.

The linkage rod 32 extends axially from the closed end of each bag through an aligned aperture 34 in transverse support beam 36, said support beam 36 being firmly anchored in the side walls of the housing 10, whereby it provides a base that will support an axial force for holding the filter bags in an extended position.

The means for applying an axial force to said fiter bags comprises essentially a compression spring 38 surrounding the end of linkage rod 32 that extends through the aperture 34 in the transverse support 36. The spring is compressed between the support 36 and a spring adjusting means on the linkage 32, whereby compression on the the spring may be varied by simply sliding the adjusting means axially along the linkage rod 32.

The spring adjusting means comprises essentially a wedgeshaped member 44 having a transverse aperture 46 normal to one side thereof and sized to permit movement of the linkage rod 32 axially therethrough. If the linkage rod 32 is aligned perfectly with the axis of cylindrical aperture 46, the member 44 will slide freely along the rod, however if the axis of the linkage rod 32 should become tilted slightly within the cylindrical opening 46, the edges of the wedges 44 at "a" and "b" would frictionally abut the rod 32 (as shown in FIG. 3), whereby the wedge 44 would become locked thereon and unable to slide longitudinally along the rod. However, should the wedge 44 be adjusted whereby the cylindrical aperture 46 therethrough would again be axially aligned with the linkage rod 32, relative movement would be easily effected.

A preferred form of my invention shown in FIG. 1 includes an assembly of paired wedges with the openings therethrough normal to an inclined face of each wedge member and oblique with respect to another. The wedge-shaped members are in juxtaposition and oppositely disposed on a single linkage rod 32 whereby a face of each wedge lies normal to said rod on the outside of said wedge assembly, and the oblique faces of said wedge assembly confront one another. The force of spring 38 causes the bases of said wedge-shaped members to abut one another and tilt on rod 32 whereby they become frictionally locked thereon, unable to move. It is only necessary to move apart the tapered ends of said wedge members until the cylindrical apertures 46 are again axially aligned upon the linkage rod 32. At this point the wedge members may be freely moved longitudinally against the spring member 38 to compress it as desired, whereby said spring will maintain each filter bag in an extended condition. When the proper bag tension is obtained, the wedge members are again permitted to be contacted freely be the spring 38, so when base portions of the wedge members abut, the cylindrical openings are moved out of alignment with rod 32 and the rod becomes locked in the openings 46.

Although the multiple wedge members shown in FIG. 1 produce a strong locking action upon the transverse rod 32, because there are four locking edges, a single wedge 44 with a pair of locking edges may prove sufficient to produce a satisfactory locking action for most applications in the manner shown by FIG. 3. Here the oblique face of the wedge member faces the end of spring 38, whereby the opening therethrough is thrown out of alignment with concentric linkage rod 32 so an opposite pair of edges "*a*" and "*b*" frictionally abut the rod to prevent axial movement.

Each housing is provided with a hopper bottom 52 that includes a conventional star valve 54 or the like, whereby deposits of foreign matter that are removed from the carrier gas may in turn be removed from the housing. Also, the top of the housing 10 lying adjacent the adjusting means 44 is provided with an access door 56 that is adapted to be removed by the removal of holding nuts 58 to permit ready access to the filter bag assemblies and their adjusting means.

Other structural variations may be effected in the shape of the housing or the arrangement of filter bags therein without departing from the spirit of the invention. It is intended therefore that the present invention should be limited only by the scope of the following claims.

I claim:

1. Apparatus for filtering solids from a carrier gas comprising a housing having an inlet duct for dust bearing carrier gas and an outlet duct for clean gas from which dust has been removed, an apertured tube sheet comprising a plurality of apertures and extending across said housing to provide an inlet compartment adjacent the inlet duct and an outlet compartment adjacent the outlet duct, a plurality of tubular filter bags each having an open end thereof attached to the periphery of one of said apertures of the tube sheet and a closed end extending axially therefrom, means for holding the filter bags in an extended condition comprising an apertured beam extending across said housing, a linkage rod extending axially from the closed end of each filter bag through an aperture of said beam, spring means biasing each linkage rod axially relative to said beam to hold each filter bag in an extended condition, and spring adjusting means slidably mounted on each linkage rod to vary the tension of the spring biasing means on each of the filter bags.

2. Apparatus as defined in claim 1 wherein the spring biasing means comprises a compression spring intermediate the apertured beam and the spring adjusting means.

3. Apparatus as defined in claim 1 wherein the spring adjusting means is wedge-shaped having a transverse aperture through which said rod passes and having one face lying oblique with respect to said transverse aperture and one lying normal thereto.

* * * * *